United States Patent
Bhattacharyya et al.

(10) Patent No.: US 6,953,488 B2
(45) Date of Patent: Oct. 11, 2005

(54) PREPARING SYNTHESIS GAS USING HYDROTALCITE-DERIVED NICKEL CATALYSTS

(75) Inventors: Alakananda Bhattacharyya, Glen Ellyn, IL (US); Wen-Dong Chang, Houston, TX (US)

(73) Assignee: BP Corporation North America Inc., Warrenville, IL (US)

( * ) Notice: Subject to any disclaimer, the term of this patent is extended or adjusted under 35 U.S.C. 154(b) by 0 days.

(21) Appl. No.: 10/388,154

(22) Filed: Mar. 13, 2003

(65) Prior Publication Data

US 2003/0172590 A1 Sep. 18, 2003

Related U.S. Application Data

(63) Continuation of application No. 09/849,689, filed on May 4, 2001, now abandoned, which is a continuation of application No. 09/410,392, filed on Oct. 1, 1999, now abandoned.

(51) Int. Cl.$^7$ .................................................. C01B 3/32
(52) U.S. Cl. .................... 48/198.7; 48/127.7; 48/198.5; 502/80; 502/84; 502/337; 423/654; 422/190; 422/211
(58) Field of Search ............................ 48/197 R, 198.1, 48/198.5, 198.7, 197 FM, 127.9, 127.3, 127.5, 127.7; 502/80, 84, 337; 422/187, 188, 190, 211; 423/648.1, 650, 651, 652, 653, 654

(56) References Cited

U.S. PATENT DOCUMENTS

| 3,615,299 | A | * | 10/1971 | Fischer et al. ................. 48/194 |
| 3,619,144 | A | * | 11/1971 | Bawa et al. ................. 422/193 |
| 3,771,261 | A | * | 11/1973 | Mandelik et al. .......... 48/214 A |
| 3,988,425 | A | * | 10/1976 | Jockel et al. ............. 423/418.2 |
| 5,399,537 | A | * | 3/1995 | Bhattacharyya et al. ...... 502/84 |

* cited by examiner

*Primary Examiner*—Basia Ridley
(74) *Attorney, Agent, or Firm*—John L. Wood

(57) ABSTRACT

There is provided a process for preparation of synthesis gas from feedstocks containing methane and/or higher hydrocarbons having from about 2 to about 12 carbon atoms by an initial catalytic treatment of feedstock to provide a methane-containing gaseous mixture substantially free of compounds having 2 or more carbon atoms, and reforming the gaseous mixture at elevated temperatures using nickel-containing catalytic materials that are unusually active under mild conditions of conversion and resistant to deactivation. The process consists fundamentally in converting the higher hydrocarbon compounds to form the methane-containing gaseous mixture in an initial conversion zone containing a catalyst while controlling temperatures within the initial conversion zone to temperatures in a range downward from about 500° C. to about 300° C., and reforming the methane-containing gaseous mixture in a subsequent zone to form synthesis gas.

23 Claims, No Drawings

PREPARING SYNTHESIS GAS USING HYDROTALCITE-DERIVED NICKEL CATALYSTS

This is a continuation of application Ser. No. 09/849,689, filed May 4, 2001 now abandoned, which is a continuation of Ser. No. 09/410,392, filed Oct. 1, 1999, now abandoned.

TECHNICAL FIELD

This invention relates to a method for preparing mixtures containing dihydrogen and oxides of carbon from feedstocks containing methane and/or hydrocarbons having from about 2 to about 12 carbon atoms. More particularly, this invention relates to a process for preparation of synthesis gas by an initial catalytic treatment of feedstock to provide a methane-containing gaseous mixture substantially free of compounds having 2 or more carbon atoms, and reforming the gaseous mixture at elevated temperatures using nickel-containing catalytic materials that are unusually active under mild conditions of conversion and resistant to deactivation.

Where the catalyst comprises mixtures formed by heat treating selected nickel containing hydrotalcite compounds, the same catalyst composition has been found suitable for both the initial catalytic treatment and the subsequent reforming steps. Thus advantageous use of single vessel for both steps becomes practical.

BACKGROUND OF THE INVENTION

Synthesis gas, a mixture of carbon monoxide (CO) and molecular hydrogen ($H_2$), is a valuable industrial feedstock for the manufacture of a variety of useful chemicals. For example, synthesis gas can be used to prepare methanol or acetic acid. Synthesis gas can also be used to prepare higher molecular weight alcohols or aldehydes as well as higher molecular weight hydrocarbons.

Perhaps the most common commercial source of synthesis gas is the steam reforming of coal or a hydrocarbon, particularly natural gas. In the steam reforming process, a mixture of water and the hydrocarbon are contacted at a high temperature, for example, in the range of about 850 to about 900° C., and typically in the presence of a catalyst, to form a mixture of hydrogen and carbon monoxide. Using methane as the hydrocarbon, the theoretical stoichiometry for the steam reforming reaction is as follows:

$$CH_4 + H_2O \rightarrow 3H_2 + CO.$$

In prior steam reforming processes, because of the large amount of steam typically necessary to reduce coke formation, the ratio of $H_2$ to CO produced is typically greater than 3:1 and can be 5:1.

The steam reforming reaction is a highly endothermic reaction, and, as discussed above, it produces a relatively high molar ratio of hydrogen to carbon monoxide when conventional processes are used. In some processes using synthesis gas, the excess hydrogen is not necessary and must be separated from the CO. For example, the manufacture of methanol or acetic acid from synthesis gas requires less than a 3:1 molar ratio of hydrogen to carbon monoxide.

There are other methods for preparing synthesis gas than the steam reforming reaction. Synthesis gas produced by the partial oxidation of methane, for example, is an exothermic reaction and produces synthesis gas having a lower ratio of hydrogen to carbon monoxide, according to the following equation:

$$CH_4 + 1/2 O_2 \rightarrow 2H_2 + CO.$$

Synthesis gas can also be produced by the reaction of a hydrocarbyl, compound such as methane with carbon dioxide. This reaction proceeds according to the following equation:

$$CH_4 + CO_2 \rightarrow 2H_2 + 2CO.$$

This reaction, like the steam reforming reaction, is endothermic; however, it produces a low ratio of hydrogen to carbon monoxide (1:1) and is very useful where there is an abundant supply of carbon dioxide, for example, at a refinery or near naturally-occurring $CO_2$ reserves. Additionally, the reforming reaction using carbon dioxide can also be used in conjunction with the steam reforming reaction to adjust the ratio of hydrogen to carbon monoxide.

In all of the hereinabove described processes for preparing synthesis gas, it is advantageous to conduct the reaction of the hydrocarbyl compound with the source of oxygen in the presence of a catalyst. For example, catalysts for the steam reforming of methane and other hydrocarbons are commonly based on nickel as the active catalyst component. Vernon et al. in Catalysis Letters, Vol. 6, pages 181–186, 1990, discloses that methane can be converted to synthesis gas over catalysts such as palladium, platinum, or ruthenium on alumina, nickel on alumina, and certain transition metal oxides including $Pr_2Ru_2O_7$ and $Eu_2Ir_2O_7$. While Vernon et al. discloses that nickel on alumina catalysts are effective for the conversion of methane to synthesis gas using molecular oxygen, we have determined that such a catalyst, as well as commercial nickel-containing steam reforming and steam cracking catalysts, form coke and deactivate relatively rapidly. While the other catalysts described in Vernon et al., such as ruthenium on alumina, can be used to reform a hydrocarbyl compound such as methane in the presence of molecular oxygen, such transition metals are expensive and the transition metal catalyst based on ruthenium we evaluated exhibited lower conversion and lower selectivity to synthesis gas compared to the catalysts of this invention. Ashcroft et al. in Nature, Volume 352, page 225, 1991, describes the reforming of methane with carbon dioxide to form synthesis gas using catalysts such as palladium, ruthenium and iridium on alumina, as well as nickel on alumina.

U.S. Pat. No. 3,791,993 to Rostrup-Nielsen discloses the preparation of catalysts containing nickel for reforming gaseous or vaporizable liquid hydrocarbons using steam, carbon dioxide, oxygen and/or air. The catalysts disclosed therein are prepared by coprecipitating a nickel salt, a magnesium salt and an aluminate to form a sludge, washing the sludge until it is substantially free of sodium and potassium, drying, and then dehydrating at 300–750° C. The ultimate catalyst is formed after a calcination step at 850–1100° C. The examples in the U.S. Pat. No. 3,791,993 show that compositions having a 1:1:2 or a 2:7:1 mole ratio of nickel, magnesium and aluminum, respectively, are suitable for converting naphtha to hydrogen-rich gaseous products using steam reforming.

In view of the great commercial interest in preparing synthesis gas by reforming readily available hydrocarbon feedstocks such as natural gas, and because of the benefits of conducting these reforming reactions in the presence of a catalyst that remains active for an extended period of use, there is a continuing need for new, less expensive, durable, coke resistant, more active and selective catalysts for the production of synthesis gas. The present invention provides such catalysts as well as a method for preparing synthesis gas using such catalysts.

The catalysts useful in the process of this invention can be prepared from a nickel-containing catalyst precursor compound having a structure that is referred to as "hydrotalcite-like." Hydrotalcite-like compounds are anionic clays, both natural and synthetic, that have a layered or sheet-like structure. For example, hydrotalcite, a naturally occurring mineral, has the chemical composition $[Mg_6Al_2(OH)_{16}]$ $CO_3 \cdot 4H_2O$, and is composed of molecular "sheets", each sheet comprising a mixture of magnesium and aluminum hydroxides. The sheets are separated by carbonate ions which balance the net positive charge of the sheets. In these "sheets," the magnesium and aluminum ions are 6-fold coordinate in hydroxide, and the resulting octahedra share edges to form infinite sheets. Water molecules, like the carbonate ions, are randomly located in the space between these sheets. Although pure hydrotalcite contains only magnesium and aluminum cations, a variety of naturally occurring, as well as synthetic hydrotalcite-like compositions are known. A general formula for these hydrotalcite-like compounds is:

wherein x generally is a number between 0.1 and 0.50, $M^{2+}$ is a 2+ metal ion, for example, $Mg^{2+}$ and $M^{3+}$ is a 3+ metal ion, for example, $Al^{3+}$. The anion, $A^{n-}$, can be one of a number of anions such as carbonate. Hydrotalcite-like compounds containing borate as the anion have been disclosed by Bhattacharyya et al., in Inorganic Chemistry, Volume 31, page 3869, 1992. Drezdzon, in Inorganic Chemistry, Volume 27, page 4628, 1988, discloses the synthesis of isopolymetalate-pillared hydrotalcites.

As described above, hydrotalcite-like compounds share the "sheet-like" structural characteristics, which is conveniently identified using X-ray powder diffraction (XRD) analyses. Hydrotalcite-like materials typically have a d(001) value of at least about 7.8 Å. Based on the size of the anion used, the hydrotalcite-like molecules can have d(001) values up to 15 Å. The d(001) value is indicative of the inter layer spacing present in the hydrotalcite-like materials.

Hydrotalcite-like compounds have been used as catalysts in a variety of applications, such as catalysts for aldol condensation, polymerization of alkene oxides, hydrogenation catalysts, dehydrogenation catalysts, etc., as described in F. Cavani et al., Catalysis Today, Volume 11, pages 173–301, 1991. Cavani et al. discloses that coprecipitated Ni, Al-based catalysts have been recognized as satisfying all the requirements for operation in steam reforming for methane production, and that coprecipitated catalysts calcined at 723 K. (450° C.) and reduced at 723 K. were active in the 673–923 K. (450–650° C.) range for steam cracking of naphtha to produce methane. U.S. Pat. No. 3,865,753 to Broecker et al. discloses the use of a catalyst prepared by calcining $[Ni_5MgAl_2(OH)_{16}]CO_3 \cdot 4H_2O$ at a temperature in the range of 350° C. to 550° C., and which is subsequently reduced with hydrogen. Such a catalyst was used for the steam cracking of hydrocarbons having 2 to 30 carbon atoms at a temperature in the range of 300 to 450° C. to form methane. Ross et al., J. of Catalysis, Volume 52, pages 280–290, 1978, have examined the reaction of methane with water over a catalyst derived from $Ni_6Al_2(OH)_{16}CO_3 \cdot 4H_2O$ at temperatures of 873–973 K. (600–700° C.). Kruissink et al., J. Chemical Society, Faraday Trans. I, Volume 77, 649–663, 1981, discusses the thermal treatment of nickel-containing compositions having x-ray patterns characteristic of the hydrotalcite-like minerals; and Hernandez et al., Thermochemica Acta, Volume 81, 311–318, 1984, investigated the thermal decomposition of hydrotalcite-like compounds of formula $[Ni_{(1-x)}Al_x(OH)_2]^{x+}X^n{}_{x/n} \cdot mH_2O$ where 0.25 is less than or equal to x is less than or equal to 0.33 and X is carbonate and sulfate. Using x-ray diffraction studies, these researchers identified nickel oxide as the decomposition product at temperatures above 600° C., whereas the corresponding spinel, $NiAl_2O_4$, was formed at temperatures higher than 1000° C. British Patent 1,342,020, discloses catalysts having chemical composition $Ni_6Al_2CO_3$ $(OH)_{16} \cdot 4H_2O$ and $Ni_3Mg_3Al_2CO_3(OH)_{16} \cdot 4H_2O$ and discloses that they have an application as hydrogenation, dealkylation and cracking catalysts. Clause et al, J. of Catalysis, Volume 133, 231–246 (1992) discloses the preparation and analysis of nickel-aluminum mixed oxides obtained by thermal decomposition of hydrotalcite-type precipitates. This paper also discloses that nickel-aluminum mixed oxides resulting from the thermal decomposition of hydrotalcite-like coprecipitates have been studied for steam reforming and methanation reactions.

Researchers are continuing their search for improved processes preparation of synthesis gas from feedstocks containing methane and/or higher hydrocarbon mixtures, i.e. hydrocarbon mixtures containing higher paraffins (especially paraffins above C3), olefins, aromatics and other hydrocarbons causing difficulties during reforming, especially by causing the deposition of carbon on the catalyst. Advantageously, the invention provides a process for the preparation of synthesis gas using a catalyst which on one side is physically and chemically sturdy, and on the other side has and retains for a long time a high activity, even when the same catalyst is used for initial catalytic treatment of feedstock at low temperatures and for reforming. Particularly it is the object of the invention to provide a process in which such catalysts can be employed under exacting working conditions, such as high pressure, high temperature and low steam to carbon ratio in the reaction mixture to reform.

SUMMARY OF THE INVENTION

This invention is a process for preparation of synthesis gas, i.e. mixtures containing dihydrogen and oxides of carbon, from feedstocks containing methane and/or higher hydrocarbons having from about 2 to about 12 carbon atoms by an initial catalytic treatment of feedstock to provide a methane-containing gaseous mixture substantially free of compounds having 2 or more carbon atoms, and reforming the gaseous mixture at elevated temperatures using nickel-containing catalytic materials that are unusually active under mild conditions of conversion and resistant to deactivation.

In one aspect, this invention is a process for preparation of synthesis gas containing dihydrogen and oxides of carbon from feedstocks containing methane and/or higher hydrocarbons having from about 2 to about 12 carbon atoms which comprises the steps of (A) feeding a stream comprising one or more hydrocarbon compounds having up to about 12 carbon atoms, and steam and/or carbon dioxide into an initial conversion zone containing a catalyst, (B) controlling temperatures within the initial conversion zone to temperatures below pyrolysis temperature of any feed hydrocarbon, preferably temperatures in a range of temperature downward from about 500° C. to about 300° C., (C) converting the higher hydrocarbon compounds in the presence of the initial conversion zone catalyst to form a methane-containing gaseous mixture substantially free of compounds having 2 or more carbon atoms, and (D) reforming the methane-containing gaseous mixture with steam and/or carbon dioxide in a subsequent zone containing catalyst at elevated temperatures and pressure sufficient to form synthesis gas, wherein the catalysts comprise mixtures formed by heat treating a nickel containing hydrotalcite compound to temperatures in a temperature range upward from about 400° C.

The reforming step (D) is carried out at temperatures upward from about 500° C., preferably, at temperatures in a range of temperature from about 600° C. to 1100° C., and more preferably from about 650° C. to 1050° C.

The key operating parameters for an adiabatic initial conversion zone are inlet temperature, amount of hydrogen recycle and the steam to carbon ratio. Actual design conditions depend on the type of feedstock.

In preferred aspect, this invention is a process wherein the stream feeding into the initial conversion zone is derived from a source of natural gas, and the amount of steam is sufficient to provide a ratio of steam to carbon in a range upward from about 0.1. Preferably the amount of steam feeding into the initial conversion zone is sufficient to provide a ratio of steam to carbon in a range from about 0.2 to about 2, and more preferably from about 0.25 to 1.5.

In another aspect, this invention is wherein the stream feeding into the initial conversion zone comprises naphthas with a final boiling point up to about 200° C., and the amount of steam feeding into the initial conversion zone is sufficient to provide a ratio of steam to carbon in a range upward from about 1.5. Preferably the amount of steam is sufficient to provide a ratio of steam to carbon in a range from about 1.5 to about 10, and more preferably from about 1.5 to 3.5.

Catalyst used in the initial conversion zone and catalyst used in a subsequent zone can, if desired, be independently selected. Preferably catalyst in each zone comprise mixtures formed by heat treating a nickel containing hydrotalcite compound to temperatures in a temperature range upward from about 700° C., and the catalyst comprises nickel at an amount of from about 5 to 75 percent based upon the weight of the catalyst.

According to the invention, the catalysts are formed by heat treating to temperatures of at least about 700° C. a catalyst precursor composition comprising at least one hydrotalcite-like compound having the formula:

$$[M^{2+}_{(1-x)}M_x^{3+}(OH)_2]^{x+}(A_{x/n}^{n-}) \cdot mH_2O,$$

where $M^{2+}$ is a metal ion having a valence of 2+ and is at least $Ni^{2+}$ or preferably, a mixture of $Ni^{2+}$ and $Mg^{2+}$, optionally with one or more metals having a valence of 2+ and preferably selected from $Cu^{2+}$, $Co^{2+}$, $Zn^{2+}$, $Fe^{2+}$ or $Mn^{2+}$; $M^{3+}$ is a metal ion having a valence of 3+ and suitably selected from $Al^{3+}$, $Ga^{3+}$, $Ni^{3+}$, $Co^{3+}$, $Fe^{3+}$, $Mn^{3+}$, $Cr^{3+}$, $V^{3+}$, $Ti^{3+}$, $La^{3+}$ or $In^{3+}$, preferably $M^{3+}$ is at least Al3+, optionally with one or more selected from $Ga^{3+}$, $Ni^{3+}$, $Co^{3+}$, $Fe^{3+}$, $Mn^{3+}$, $Cr^{3+}$, $V^{3+}$, $Ti^{3+}$, $La^{3+}$ or $In^{3+}$; x is a number of about 0.1 to about 0.50, wherein the value of x and (1–x) are obtained by combining all of the metal ions having a 3+ valence, and 2+ valence, respectively; $A^{n-}$ is an anion having a negative charge of n, and n can suitably be 1 to about 10; and m is 0 or a positive number. A mixture of anions can also be used.

In another aspect of the invention the catalysts are formed by heat treating a hydrotalcite-like catalyst precursor compound having the formula:

$$[M^{2+}_{(1-x)}M_x^{3+}(OH)_2]^{x+}(A_{x/n}^{n-}) \cdot mH_2O,$$

wherein $M^{2+}$ is a metal ion having a valence of 2+ and is at least a mixture of $Ni^{2+}$ and $Mg^{2+}$, optionally with one or more other metal ions having a valence of 2+, and preferably selected from $Cu^{2+}$, $Co^{2+}$, $Zn^{2+}$, $Fe^{2+}$ or $Mn^{2+}$; $M^{3+}$ is a metal ion having a valence of 3+ and is at least $Al^{3+}$, optionally with one or more other metal ions having a valence of 3+, and preferably selected from $Ga^{3+}$, $Ni^{3+}$, $Co^{3+}$, $Fe^{3+}$, $Mn^{3+}$, $Cr^{3+}$, $V^{3+}$, $Ti^{3+}$, $La^{3+}$ or $In^{3+}$; x is a number greater than about 0.25 to about 0.50; $A^{n-}$ is an anion having a negative charge n, wherein n can be 1 to about 10; and m is 0 or a positive number.

In still another aspect of the invention the catalyst compositions comprise (a) $M^{2+}O$, (b) $M^{2+}Al_2O_4$ spinel and (c) a hybrid phase comprising (i) a $M^{2+}O$ component and (ii) a $M^{2+}Al_2O_4$ spinel component in the same catalyst crystallite and joined through an epitaxial interface, said epitaxial interface being an area in the crystallite where crystalline species of both components (i) and (ii) coexist and form a well defined interface, and wherein $M^{2+}$ is $Ni^{2+}$ or a mixture of $Ni^{2+}$ plus another metal ion or plus other metal ions.

In preferred aspects of the invention, $M^{2+}$ is $Ni^{2+}$ or a mixture of $Ni^{2+}$ and $Mg^{2+}$; the catalyst contains metal particles of about 1 to about 1000 nanometers in size and containing at least nickel in the zero oxidation state; and/or the reforming catalyst comprises metal particles of about 1 to about 1000 nanometers in size and comprising at least nickel in the zero oxidation state, the external surface area of the metal particles being mostly surrounded by spinel crystallites, the spinel crystallites comprising $M_2^{3+}O_3$ or $M^{2+}M_2^{3+}O_4$ or a mixture thereof where $M^{2+}$ is a metal in the 2+ oxidation state, and $M^{3+}$ is a metal in the 3+ oxidation state.

Where the catalyst comprises mixtures formed by heat treating selected nickel containing hydrotalcite compounds, the same catalyst composition has been found suitable for both the initial catalytic treatment and the subsequent reforming steps. Thus advantageous use of single vessel for both steps becomes practical. These high activity dual function clay-derived catalysts can be used for converting natural gas to syngas with identified temperature profile in a catalyst bed between initial and subsequent zones. Since no additional vessel is needed at front-end, capital and operating costs will be lower than commercial processes.

Processes for syngas generation include steam reforming, partial oxidation, $CO_2$ reforming, and their combined processes.

Other advantages of the invention will be apparent to those skilled in the art from a review of the following detailed description, taken in conjunction with the appended claims.

DESCRIPTION OF THE INVENTION

The catalytic materials useful in the method of this invention for preparing synthesis gas are suitably prepared by heat treating a catalyst precursor composition comprising one or more hydrotalcite-like compounds comprising the formula:

$$[M^{2+}_{(1-x)}M_x^{3+}(OH)_2]^{x+}(A_{x/n}^{n-}) \cdot mH_2O, \tag{1}$$

where $M^{2+}$ is $Ni^{2+}$ or a mixture of $Ni^{2+}$ and at least one other metal ion, preferably having a 2+ valence and more preferably selected from $Ca^{2+}$, $Cd^{2+}$, $Co^{2+}$, $Cu^{2+}$, $Fe^{2+}$, $Mg^{2+}$, $Mn^{2+}$, $Pd^{2+}$, $Pt^{2+}$, $Sr^{2+}$, $Ti^{2+}$, $V^{2+}$, $Zn^{2+}$ and $Zr^{2+}$. The atomic ratio of $Ni^{2+}$ to other metal ion or ions present having a 2+ charge is suitably in the range of about 100:1 to about 0.05:1, preferably 5:1 to about 0.1:1.

$M^{3+}$ in the formula above is at least one metal ion having a valence of 3+ and is and preferably selected from $Al^{3+}$, $B^{3+}$, $Cr^{3+}$, $Fe^{3+}$, $Ga^{3+}$, $In^{3+}$, $La^{3+}$, $Ni^{3+}$, $Co^{3+}$, $Mn^{3+}$, $Rh^{3+}$, $Ti^{3+}$, $Tl^{3+}$, $V^{3+}$ and the trivalent lanthanum metal ions. Preferably $M^{3+}$ is at least $Al^{3+}$. When a mixture of $Al^{3+}$ and at least one other metal ion having a valence of 3+ are present, the atomic ratio of $Al^{3+}$ to the other $M^{3+}$ ion or ions present in suitably about 100:1 to about 0.05:1.

The anion, A, in the formula (1) above can be any anion that provides for a hydrotalcite-like structure and can be, for example, carbonate, nitrate, a halide (e.g. $Cl^-$, $Br^-$), chlorate, sulfate, hydroxide, oxide, carboxylates and polycarboxylates; particularly those having one to about 20 carbon atoms, including, for example, acetate, benzoate, the phthalates, and the like, phosphates, boron containing anions, metalates of metals from Group Vb of the Periodic Table of Elements, metalates of metals of Group VIb of the Periodic Table. Examples of borates and metalates include, $B(OH)_4^-$, $[B_3O_3(OH)_4]^-$, $[B_3O_3(OH)_5]^{2-}$, $[B_4O_5(OH)_4]^{2-}$, $V_2O_7^{4-}$, $HV_2O_7^{3-}$, $V_4O_{12}^{4-}$, $V_3O_9^{3-}$ and $V_{10}O_{28}^{6-}$. Examples of phosphates include $PO_4^{3-}$, $HPO_4^{2-}$ and $H_2PO_4^-$. Other anions that can be used include $Nb_6O_{19}^{8-}$, $HNb_6O_{19}^{7-}$, $H_2Nb_6O_{19}^{6-}$, $NbO_4^{3-}$, $Ta_6O_{19}^{8-}$, $HTa_6O_{19}^{7-}$, $TaO_4^{3-}$, $Mo_7O_{24}^{6-}$, $HW_6O_{21}^{5-}$, and Keggin-type anions such as $PW_{11}O_{39}^{7-}$ and $SiW_{11}O_{38}^{7-}$ which are stable at a pH above 6. The value x is about 0.1 to about 0.5, preferably 0.25 to about 0.45. The value n is suitably about 1 to about 10. The amount of water present in the hydrotalcite-like catalyst precursor is variable. The amount of water can be such that the value m in the formula above is about 0 to about 2.

For example, a hydrotalcite-like compound corresponding to $[Ni_{0.625}Cu_{0.125}Al_{0.25}(OH)_2](CO_3)_{0.125} \cdot 0.5H_2O$ is a suitable precursor compound for preparing an active catalyst for the reforming of methane according to the method of this invention. In this formula, Ni and Cu have a valence of 2+; Al has a valence of 3+; and x=0.25 and m is 0.5. However, it is more convenient to express this formula using whole numbers; therefore, if the fractional numbers are multiplied by 8, the same formula can be expressed as: $[Ni_5CuAl_2(OH)_{16}]CO_3 \cdot 4H_2O$. Specific formulas for the hydrotalcite-like compounds are represented herein using whole numbers. Another example of a suitable hydrotalcite-like catalyst precursor compound is $[NiZnMg_2Al_2(OH)_{12}]Mo_2O_7 \cdot 4H_2O$. In this compound, x=0.333, n=2, m=0.666, and the formula has been multiplied by 6 to convert the fractional numbers to whole numbers. Another example is a compound having formula $[Ni_4Zn_2Cu_2Mg_4Al_4(OH)_{32}]V_4O_{12} \cdot 8H_2O$. In this formula, x=0.25, n=4, m=0.5, and it has been multiplied by 16 to convert the fractional numbers in the formula to whole numbers.

Preferred hydrotalcite-like catalyst precursor compounds useful in the method of this invention are those compounds having the formula (1) above where $M^{2+}$ is $Ni^{2+}$, a mixture of $Ni^{2+}$ and $Mg^{2+}$, a mixture of $Ni^{2+}$ and $Cu^{2+}$ or a mixture of $Ni^{2+}$, $Cu^{2+}$ and $Mg^{2+}$ and where $M^{3+}$ is $Al^{3+}$. In these preferred catalyst precursor compositions, wherein a mixture of nickel and magnesium and/or copper are used, the molar ratio of $Ni^{2+}$ to $Mg^{2+}$ and/or $Cu^{2+}$ is in the range of about 1:100 to about 100:1. Specific examples of preferred hydrotalcite-like catalyst precursor compounds are: $[Ni_8Al_2(OH)_{20}]CO_3 \cdot yH_2O$; $[Ni_6Al_2(OH)_{16}]CO_3 \cdot yH_2O$; $[Ni_5MgAl_2(OH)_{16}]CO_3 \cdot yH_2O$; $[Ni_4Mg_2Al_2(OH)_{16}]CO_3 \cdot yH_2O$; $[Ni_3Mg_3Al_2(OH)_{16}]CO_3 \cdot yH_2O$; $[Ni_2Mg_4Al_2(OH)_{16}]CO_3 \cdot yH_2O$; $[NiMg_5Al_2(OH)_{16}]CO_3 \cdot yH_2O$; $[Ni_4Al_2(OH)_{12}]CO_3 \cdot yH_2O$; $[Ni_3MgAl_2(OH)_{12}]CO_3 \cdot yH_2O$; $[Ni_2Mg_2Al_2(OH)_{12}]CO_3 \cdot yH_2O$; $[NiMg_3Al_2(OH)_{12}]CO_3 \cdot yH_2O$; $[Ni_{14}Al_6(OH)_{40}](CO_3)_3 \cdot yH_2O$; $[Ni_{12}Mg_2Al_6(OH)_{40}](CO_3)_3 \cdot yH_2O$; $[Ni_1Mg_{13}Al_6(OH)_{40}](CO_3)_3 \cdot yH_2O$; $[Ni_3Al_2(OH)_{10}]CO_3 \cdot yH_2O$; $[Ni_2MgAl_2(OH)_{10}]CO_3 \cdot yH_2O$; $[Ni_1Mg_2Al_2(OH)_{10}]CO_3 \cdot yH_2O$; $[Ni_2Al_2(OH)_8]CO_3 \cdot yH_2O$; $[NiMgAl_2(OH)_8]CO_3 \cdot yH_2O$; $[Ni_2MgCuAl_2(OH)_{12}]CO_3 \cdot yH_2O$; and $Ni_2Cu_2Al_2(OH)_{12}CO_3 \cdot yH_2O$; and the like, and where y in these formulas is 0–20.

A particularly preferred group of catalyst precursor compounds that are useful in the method of this invention are those hydrotalcite-like compounds having the formula (1) above where $M^{2+}$ is a mixture of $Ni^{2+}$ and $Mg^{2+}$, but can also contain one or more other metal ions having a 2+ valence, and preferably selected from $Cu^{2+}$, $Co^{2+}$, $Zn^{2+}$, $Fe^{2+}$ or $Mn^{2+}$; $M^{3+}$ is a metal ion having a valence of 3+ and is at least $Al^{3+}$, optionally with one or more other metal ion having a valence of 3+, and preferably selected from $Ga^{3+}$, $Ni^{3+}$, $Co^{3+}$, $Fe^{3+}$, $Mn^{3+}$, $Cr^{3+}$, $V^{3+}$, $Ti^{3+}$, $La^{3+}$ or $In^{3+}$; x is a number greater than about 0.25, more preferably greater than about 0.28 to about 0.50, more preferably to about 0.45; $A^{n-}$ is an anion, for example, as described above, having a negative charge n, and m is 0 or a positive number. Catalyst formed from these precursor compounds demonstrate higher activity and superior resistance to coke formation during the reforming reaction disclosed herein.

Another particularly preferred group of catalyst precursor compounds are those hydrotalcite-like compounds having formula (1) where $M^{2+}$ is at least, and preferably is, a mixture of $Ni^{2+}$ and $Cu^{2+}$, and where $M^{3+}$ is at least $Al^{3+}$ and preferably is $Al^{3+}$; where x is about 0.1 to about 0.5, preferably about 0.25 to about 0.45; A is an anion, preferably as discussed hereinabove, having negative charge n; and m is 0 or a positive number, preferably 0–2.

The hydrotalcite-like catalyst precursor compounds described herein are activated through heat treatment, i.e. they are thermally activated. The heat treatment is typically conducted by subjecting the hydrotalcite-like compound to a temperature of at least 700° C., more preferably at least about 800° C., for a time sufficient to convert the hydrotalcite-like catalyst precursor compound into an active catalyst for the reforming of hydrocarbyl compounds. This heating can be done prior to using the catalyst precursor for a reforming reaction, or it can be done in the reactor apparatus used for the reforming reaction, preferably under reforming conditions. For example, the temperature used for the reforming reactions are typically sufficiently high to activate the catalyst precursor compounds. During the heat treatment to form the active catalyst, the hydrotalcite-like compounds first lose water that is located between the hydroxide layers. This typically occurs at temperatures in the range of about 200° C. to about 250° C. This is a reversible reaction, however, since the dehydrated hydrotalcite-like compositions can be again hydrated to restore their original hydrotalcite-like structures. Upon heating to higher temperatures, for example, temperatures in excess of 450° C., another change occurs in the catalyst precursor where there is a loss of the anion, if it is volatile, or, for example, the anion loses. water if it is not volatile. However, this transformation does not irreversibly destroy the layer structure of the hydrotalcite-like composition since a layer structure can be restored by replacing the anion or hydrating the anion. Upon heating to still higher temperatures, for example, temperatures in excess of about 700° C., there is an irreversible loss of layer structure, and these heat-activated compositions are the active catalysts for the reforming of hydrocarbyl compounds according to the method of this invention.

We have determined that when the nickel-containing hydrotalcite-like catalyst precursor compounds disclosed herein are heated or thermally-activated at temperatures of at least about 700° C., preferably in the range of about 800° C. to about 1050° C., a new hybrid phase component is formed. Evaluation of heat treated $[Ni_4Al_2(OH)_{12}]CO_3 \cdot 4H_2O$ and $[Ni_2Mg_2Al_2(OH)_{12}]CO_3 \cdot 4H_2O$ compounds by High Resolution Transmission Electron Microscopy showed that the heat-treated samples contain a new hybrid phase comprising a mixture of NiO or NiO/MgO, and NiAl$_2$O$_4$ spinel or NiAl$_2$O$_4$/MgAl$_2$O$_4$ spinel or Ni/MgAl$_2$O$_4$ spinel in the same crystallite, wherein the NiO or NiO/MgO phase and the spinel phase are joined in the same crystallite by an epitaxial interface. By epitaxial interface, we mean an area in a single crystallite where, between two distinct crystalline species in the same crystallite, the two crystalline species coexist and yet form a well defined interface. Catalyst compositions containing this hybrid phase are highly active in the reforming method of this invention. Thus, this invention is a catalyst composition comprising a hybrid catalyst component comprising a M$^{2+}$O component and a M$^{2+}$Al$_2$O$_4$ spinel component in the same catalyst crystallite, wherein the M$^{2+}$O component of the crystallite and the M$^{2+}$Al$_2$O$_4$ component of the crystallite are joined through an epitaxial interface. M$^{2+}$ in this hybrid catalyst component is at least Ni$^{2+}$ and can be Ni$^{2+}$ and some other metal ion, preferably having a valence of 2+, and preferably selected from Mg$^{2+}$, Cu$^{2+}$, Co$^{2+}$, Zn$^{2+}$, Fe$^{2+}$ or Mn$^{2+}$. These crystallites comprising the hybrid phase are typically about 5 to about 400 nm in size, preferably 5 to about 100 nm in size. This catalyst composition comprising the hybrid phase can be prepared by heating one or more of the herein described nickel-containing hydrotalcite-like precursor compounds to a temperature in the range of about 800° C. to about 1050° C., and preferably by heating a nickel-containing hydrotalcite-like catalyst precursor compound wherein the M$^{2+}$ metal ion in the formula $[M^{2+}_{(1-x)}M^{3+}_x(OH)_2]^{k+}(A_{x/n}{}^{n-}) \cdot mH_2O$ is at least Ni$^{2+}$ or preferably a mixture of Ni$^{2+}$ and Mg$^{2+}$, and wherein M$^{3+}$ is at least Al$^{3+}$.

The preferred catalyst compositions of this invention for preparing synthesis gas are those compositions formed by heat treating one or more hydrotalcite-like compounds having the formula:

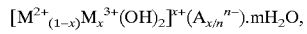

where M$^{2+}$ is a metal ion with a valence of 2+ and is at least Ni$^{2+}$ or, preferably, a mixture of Ni$^{2+}$ and Mg$^{2+}$, optionally with one or more metal ions having a valence of 2+ and preferably selected from Cu$^{2+}$, Co$^{2+}$, Zn$^{2+}$, Fe$^{2+}$ or Mn$^{2+}$, more preferably selected from Cu$^{2+}$ or Zn$^{2+}$; where M$^{3+}$ is a metal ion having a valence of 3+ and is suitably selected from at least one of Al$^{3+}$, Ga$^{3+}$, Ni$^{3+}$, Co$^{3+}$, Fe$^{3+}$, Mn$^{3+}$, Cr$^{3+}$, V$^{3+}$, Ti$^{3+}$, La$^{3+}$ or In$^{3+}$, preferably M$^{3+}$ is at least Al$^{3+}$, optionally with one or more selected from the Ga$^{3+}$, Ni$^{3+}$, Co$^{3+}$, Fe$^{3+}$, Mn$^{3+}$, Cr$^{3+}$, V$^{3+}$, Ti$^{3+}$, La$^{3+}$ or In$^{3+}$, and, most preferably, M$^{3+}$ is Al$^{3+}$; where x is a number of about 0.1 to about 0.50, preferably 0.25 to about 0.45, wherein the value x and (1−x) are obtained by combining all of the metal ions having a 3+ valence, and 2+ valence, respectively, where the anion A$^{n-}$ is an anion having a negative charge of n and is an anion that provides for a hydrotalcite-like structure, and is suitably selected from carbonate, nitrate, a halide, sulfate, chlorate, hydroxide, oxide, carboxylate, phosphates, boron containing anions, Group Vb and Vlb metalates, and the like, and, preferably, A is carbonate; and where the value of m is 0 or a positive number, preferably 0 to about 2. Particularly, preferred catalyst compositions are those herein above described hydrotalcite-like compounds that have been exposed to the reactants and reaction conditions used for the preparation of synthesis gas by the reaction of a hydrocarbyl compound with molecular oxygen, or by the reaction of a hydrocarbyl compound with carbon dioxide.

A preferred group of anions useful in the hydrotalcite-like compounds used to make catalysts is the group consisting of molybdates and polyoxomolybdates, for example Mo$_7$O$_{24}{}^{6-}$, MoO$_4{}^{2-}$, MoO$_4{}_-$, and the like. These molybdates and polyoxomolybdates are preferred because they will impart coke reducing capability to the catalyst composition of this invention.

The hydrotalcite-like precursor compounds used in the method of this invention can be prepared by using procedures known in the art. However, one procedure for preparing these hydrotalcite-like compounds comprises combining in solution, preferably in aqueous solution, a nickel 2+ compound, optionally with one or more of the other metal ions discussed hereinabove having a 2+ valence, with one or more metal ions as described hereinabove having a 3+ valence. Suitable metal compounds are the nitrates, chlorides, sulfates, and the like. The solution containing the 2+ and 3+ metal ion is combined with a solution of the desired anion, A, or a precursor to the anion. For example, A may be CO$_3{}^{2-}$, SO$_4{}^{2-}$, Cl$^-$, etc. An anion precursor is a compound which produces the desired anion under the reaction conditions used to prepare the hydrotalcite-like compound. For example, NaVO$_3$ is a precursor to the anion V$_2$O$_7{}^{4-}$ because, at a reaction mixture pH of 10–11, NaVO$_3$ yields V$_2$O$_7{}^{4-}$. The pH dependent behavior of some transition element metalates is described in Kepert, D. L., "The Early Transition Metals," Academic Press, London (1972).

Additionally, the pH of the reaction mixture used to form the hydrotalcite-like precipitate should be such that all of the M2+ and M3+ ions selected for a particular hydrotalcite-like composition are incorporated in the coprecipitate. The table presented below shows the approximate pH ranges in which hydrotalcite-like compounds are formed for a selection of metal ions.

| Divalent Metal Ion | Trivalent Metal Ion | Approximate pH Range |
|---|---|---|
| Mg$^{2+}$ | Al$^{3+}$, Fe$^{3+}$, Cr$^{3+}$, Bi$^{3+}$, Mn$^{3+}$, Co$^{3+}$ | 8 to 12–14 |
| Cu$^{2+}$ | Al$^{3+}$, Fe$^{3+}$, Cr$^{3+}$, Bi$^{3+}$, Mn$^{3+}$, Co$^{3+}$ | 6 to 12–13 |
| Co$^{2+}$ | Al$^{3+}$, Fe$^{3+}$, Cr$^{3+}$, Bi$^{3+}$, Mn$^{3+}$, Co$^{3+}$ | 8 to 12–13 |
| Zn$^{2+}$ | Al$^{3+}$, Fe$^{3+}$, Cr$^{3+}$, Bi$^{3+}$, Mn$^{3+}$, Co$^{3+}$ | 7 to 10–11 |
| Ni$^{2+}$ | Al$^{3+}$, Fe$^{3+}$, Cr$^{3+}$, Bi$^{3+}$, Mn$^{3+}$, Co$^{3+}$ | 6 to 12–13 |
| Mn$^{2+}$ | Al$^{3+}$, Fe$^{3+}$, Cr$^{3+}$, Bi$^{3+}$, Mn$^{3+}$, Co$^{3+}$ | 9 to 12–14 |
| Fe$^{2+}$ | Al$^{3+}$, Fe$^{3+}$, Cr$^{3+}$, Bi$^{3+}$, Mn$^{3+}$, Co$^{3+}$ | 7 to 12–14 |

For example, in order to prepare a nickel/aluminum hydrotalcite-like compound having a carbonate anion, the nickel and aluminum salt are combined in water and then added to a carbonate containing solution. From the table above, the approximate pH range to produce the hydrotalcite-like compound is about 6–12. Similarly, if a copper-nickel-aluminum containing hydrotalcite-like compound is desired, the pH range needs to be 6 to 12. If the desired anion, A$^{n-}$, is not stable at this pH range, then the hydrotalcite-like structures will not form. If the pH of the reaction mixture used to form the hydrotalcite-like compound requires adjustment, a base such as ammonium hydroxide, an alkali metal hydroxide or a tetralkylammonium hydroxide can be used. If an acid is required to adjust the pH, a mineral acid such as nitric acid or hydrochloric acid can be used. Also, after the proper pH has been achieved, the solution generally requires heating for a period of time, preferably at a temperature of about 40 to 90° C., to accelerate the formation of the hydrotalcite-like precipitate, which can be collected by filtration.

The molar ratio of the 2+ metal ions to 3+ metal ions is preferably about 9:1 to about 1:1. The mole ratio of the anion used to the total of 2+ and 3+ metal ions depends on the charge on the anion to be incorporated. For each metal ion with a 3+ valence, a corresponding negative charge in the anion layer of the hydrotalcite-like compound is required. Generally, a molar excess of anion is used during the preparation of the hydrotalcite-like compound in order to ensure complete reaction.

The 2+ metal ion and 3+ metal ion compounds are optimally mixed together and added slowly, with stirring, to a warmed solution of the anion. As stated above, the resulting solution must have the proper pH. Slower addition and a more elevated temperature (a pressure vessel can be used) tends to produce a product with larger crystals.

In the preferred reforming method of this invention, a vaporizable hydrocarbyl compound and an oxygen containing gas comprising molecular oxygen or carbon dioxide are fed to a suitable reaction zone, which zone contains a catalyst formed by heat treating one or more of the nickel-containing hydrotalcite-like compounds described hereinabove, and reacting the hydrocarbyl compound and the oxygen-containing gas in the presence of the reforming catalyst at reaction conditions sufficient to produce synthesis gas in the form of a mixture of molecular hydrogen and carbon monoxide. The mole ratio of hydrogen to carbon monoxide may vary, however, it is suitably in the range of about 0.1:1 to about 5:1.

The hydrocarbyl compound used in the method of this invention suitably comprises one or more gaseous or vaporizable compounds that can be reacted with molecular oxygen or carbon dioxide to form synthesis gas. Most suitably, the hydrocarbyl compound is a hydrocarbon, however, various amounts of oxygen or other atoms can also be in the hydrocarbyl molecule. For example, hydrocarbyl compounds that can be converted to synthesis gas include methanol, dimethylether, ethylene oxide, and the like. However, the most preferable hydrocarbyl compounds are the low molecular weight hydrocarbons containing about 1 to about 20 carbons, more preferably 1 to about 10 carbon atoms. Methane and natural gas, which is mainly methane, are readily available, inexpensive, and are the most preferred hydrocarbyl feed materials for the method of this invention. Mixtures of hydrocarbyl and/or hydrocarbon compounds can also be used.

The oxygen-containing gas used in the method of this invention preferably is either a gas comprising molecular oxygen or a gas comprising carbon dioxide. The gas comprising molecular oxygen is used in the method of this invention for preparing synthesis gas by the oxidation of the hydrocarbyl compound to synthesis gas. When methane is the hydrocarbyl compound, this reaction proceeds according to the partial-oxidation reaction described in the following equation:

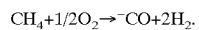
$$CH_4 + 1/2O_2 \rightarrow CO + 2H_2.$$

The oxygen-containing gas used in the method of this invention can be pure molecular oxygen or a mixture of molecular oxygen with one or more other gases such as nitrogen, helium, or some other inert gas. Air is a suitable source of molecular oxygen. The molecular oxygen can be in the oxygen-containing gas at a level of about 1% to about 100%, preferably about 20 to about 100%, most preferably the molecular oxygen containing gas is substantially pure, e.g. 98%, or pure, e.g. +99% molecular oxygen.

The amount of molecular oxygen relative to the hydrocarbyl compound fed to the reactor containing the catalyst derived from the nickel-containing hydrotalcite-like catalyst precursor is such that there is sufficient oxygen to form synthesis gas. When methane is used the molar ratio of molecular oxygen to methane in the feed compound added to the reaction zone is about 1:2. However, when high selectivity to synthesis gas is desired, the ratio of molecular oxygen to methane is about 1:2.1, and when complete methane conversion is desired, the optimal ratio of molecular oxygen to methane is about 1:1.9.

In the method of this invention wherein a hydrocarbyl compound is reacted with molecular oxygen to form synthesis gas, the reaction temperature is suitably in the range of about 400 to about 1000° C., more preferably about 600 to about 900° C. Additionally, since the reaction of the hydrocarbyl compound with molecular oxygen is exothermic, the heat produced by the process can be used as an energy source to operate other processes in a chemical manufacturing plant. For example, it can be used to generate high pressure steam. The pressure for the reaction of a hydrocarbyl compound with molecular oxygen is suitably in the range of about 0.1 atmospheres absolute to about 50 atmospheres absolute, preferably about 25 atmospheres absolute to about 40 atmospheres absolute. The space velocity is suitably that which provides for the conversion of a major portion of the hydrocarbyl feed to synthesis gas, and preferably the volumetric space velocity is in the range of about 10 $hr^{-1}$ to about $1\times10^9$ $hr^{-1}$, more preferably about 1200 to about $1\times10^6$ $hr^{-1}$. The volumetric space velocity being calculated based on the total volume of reactant gases, i.e. the gaseous hydrocarbyl feed component and the molecular-oxygen containing gas component, and the volume of the catalyst in the reactor.

Although other feed materials can be added along with the molecular oxygen-containing gas and the hydrocarbyl feed compound, for example, water or steam, it is generally not necessary to do so. One of the advantages of the method of this invention wherein a hydrocarbyl compound is converted to synthesis gas by reaction with molecular oxygen, is that the nickel-containing catalysts derived from the hydrotalcite-like catalyst precursor compounds are very resistant to coke formation. Therefore, it is not essential to add steam or water to eliminate coking of the catalyst. However, steam or water can be added in order to adjust the ratio of $H_2$ to CO in the synthesis gas product.

In the method of this invention wherein a gas comprising carbon dioxide is reacted with a hydrocarbyl compound, the gas comprising carbon dioxide is suitably about 1 to about 100% carbon dioxide, more preferably about 20 to about 100% carbon dioxide, and most preferably it is substantially pure carbon dioxide. The gas comprising carbon dioxide can contain other gases, for example, nitrogen, helium, argon and the like, however, as stated above, it is preferable to use substantially pure carbon dioxide.

In the method of this invention wherein hydrocarbyl compounds are reformed to synthesis gas using carbon dioxide, the addition of water or steam is beneficial to reduce the coking of the catalyst. The amount of steam present should be an amount sufficient to control the formation and deposition of coke on the catalyst so that deactivation does not occur. Preferably, the amount of water in the form of steam is suitably about 10 to about 50 percent of the feed gases, more preferably about 20 to about 30 percent of the total feed gas. Other materials can be added to the total feed gasses to promote the longevity of the catalyst. For example, hydrogen sulfide, or other source of sulfur, preferably a volatile source of sulfur, can be added along with the feed gas to the carbon dioxide reforming reaction. If used, hydrogen sulfide or other volatile sulfur-containing compound, e.g. an alkyl thiol, dialkyl sulfide or dialkyl disulfide, is present in the feed at a level of about 10 parts per million by weight to about 100 parts per million by weight, based on the total feed gas. However, we have determined that the catalysts of this invention are effective for reforming hydrocarbyl compounds without the use of a sulfur-containing compound in the feed gas.

The amount of carbon dioxide relative to the hydrocarbyl compound fed to the reactor containing the catalyst derived from the nickel-containing, hydrotalcite-like catalyst precursor is such that there is sufficient carbon dioxide to effectively convert the hydrocarbyl compound to synthesis gas. Suitably, the molar ratio of carbon dioxide to carbon in the hydrocarbyl feed compound is at least about 0.8:1, preferably about 1:1 to about 5:1, most preferably about 1:1 to about 2:1.

The reaction temperature for the reforming of a hydrocarbyl compound using carbon dioxide is suitably in the range of about 750 to about 950° C., more preferably about 850 to about 900° C. The pressure for the reaction of the hydrocarbyl compound with carbon dioxide is suitably in the range of about 0.1 atmosphere absolute to about 50 atmospheres absolute, more preferably about 10 atmospheres absolute to about 35 atmospheres absolute. The space velocity for this reaction is suitably that which provides for the conversion of a major portion of the hydrocarbyl compound, preferably methane, to synthesis gas. Suitable volumetric space velocities are in the range of 1000 $hr^{-1}$ to about $1 \times 10^6$ $hr^{-1}$, more preferably about $1 \times 10^4$ $hr^{-1}$ to about $1 \times 10^5$ $hr^{-1}$. The volumetric space velocity being calculated based on the total volume of gas entering the reactor containing the catalyst and the volume of the catalyst.

The nickel-containing compounds described herein prepared by heat treating the nickel-containing hydrotalcite-like compounds can also be used for the steam reforming of a hydrocarbyl compound where water is the oxygen-containing gas. Preferably the hydrocarbyl compound is methane or natural gas. The reaction temperature for the steam reforming reaction is suitably at least about 700° C. and is preferably in the range of about 800° C. to about 1000° C. The pressure is suitably at least about 0.1 to about 75 atmosphere absolute. The space velocity of the feed gas for the steam reforming reaction is suitably that which provides for the conversion of the major portion of the hydrocarbyl compound to synthesis gas. Suitable volumetric space velocities are in the range of about 1000 $hr^{-1}$ to about $1 \times 10^6$ $hr^{-1}$, preferably about $1 \times 10^4$ $hr^{-1}$ to about $1 \times 10^5$ $hr^{-1}$. The volumetric space velocity being calculated based on the total volume of gas entering the reactor containing the catalyst and the volume of the catalyst. The mole ratio of water-to-carbon in the feed gas is suitably about 10:1 to about 2:1; preferably about 8:1 to about 3:1. However, an advantage of the catalysts of this invention is that they do not readily form coke. Consequently, molar ratios of water (steam) to carbon in the hydrocarbyl portion of the feed can be low; for example, less than about 2:1, more preferably less than about 1.6:1, most preferably about 1:1. Preferably, the mole ratio of water to carbon in the feed gas is at least about 0.5:1. The ability to use low molar ratios of water to carbon is desirable because the synthesis gas product has a low ratio of hydrogen-to-carbon monoxide.

The active reforming catalysts of this invention formed during the reforming reaction described herein comprises metal particles comprising at least nickel metal (nickel in the zero oxidation state) and optionally containing one or more metals selected from Cu, Co, Fe, Mn, Pd, Pt and Zn in the zero oxidation state, wherein the zero oxidation state metal particles are mostly, more preferably substantially, and most preferably completely surrounded by crystallites having a spinel structure. The spinel crystallites comprise either $M^{3+}{}_2O_3$ and/or $M^{2+}M_2^{3+}O_4$ where $M^{2+}$ is a metal in the +2 oxidation state and is preferably at least one of $Mg^{2+}$, $Zn^{2+}$, $Ni^{2+}$, $Fe^{2+}$, $Cu^{2+}$, $Co^{2+}$, $Mn^{2+}$, $Pd^{2+}$ or $Pt^{2+}$, and $M^{3+}$ is a metal in the +3 oxidation state and is preferably at least one of $Al^{3+}$, $B^{3+}$, $Cr^{3+}$, $Fe^{3+}$, $Ga^{3+}$, $In^{3+}$, $La^{3+}$, $Ni^{3+}$, $Co^{3+}$, $Mn^{3+}$, $Rh^{3+}$, $Ti^{3+}$, $V^{3+}$ and the lanthanum 3+ ions. Most preferably, the $M^{3+}$ in the spinels is $Al^{3+}$ and most preferably $M^{2+}$, if present, is $Mg^{2+}$. The metal particles are suitably in the range of about 1 to about 1000 nanometers (nm) in size, preferably about 10 to about 500 nm in size. The atomic ratio of nickel to other metals, if present, in the metal particles is suitably in the range of about 100:1 to about 0.05:1, preferably about 5:1 to about 0.1:1. The spinel crystallites are suitably no more than about 200 nm in size, preferably no more than about 60 nm in size. Most preferably, the spinel crystallites are about 5 to about 30 nm in size. The mole ratio of the metals in the zero oxidation state to the spinel in the active reforming catalyst is typically about 20:1 to about 1:20. As used in this description of the spinel crystallites surrounding the active reforming catalyst, "mostly" means, on average, at least 50 percent of the exterior surface area of the metal particles; "substantially" means, on average, at least 80 percent of the exterior surface area of the metal particles; and "completely" means, on average, 95–100% of the surface area of the metal particles. As used in this description of the active reforming catalyst, "crystallite" means small crystals. Spinels are well-known crystal structures and are described, for example, in A. F. Wells', "Structural Inorganic Chemistry," Claredon Press, Oxford, 1987. The active reforming catalyst is most suitably prepared by treating, under reforming reaction conditions as described herein, the nickel-containing hydrotalcite-like compositions described herein.

The type of reactor used in the method of this invention is any type reactor that can be used to conduct a gas phase reaction over a heterogeneous, solid catalyst. For example, a fixed bed reactor, a fluidized bed reactor and the like.

The catalyst compositions described herein above can be used as such, or they can be supported on one or more inert support materials such as alpha alumina, silica, and the like. Preferably the catalyst composition, either supported or unsupported, are formed into shapes that are suitable for use in gas-phase reaction vessels, e.g. spheres, cylinders, rings, etc.

For a more complete understanding of the present invention, reference should now be made to the embodiments illustrated in greater detail by way of examples of the invention.

EXAMPLES OF THE INVENTION

The following Examples will serve to illustrate certain specific embodiments of the herein disclosed invention. These Examples should not, however, be construed as limiting the scope of the novel invention as there are many variations which may be made thereon without departing from the spirit of the disclosed invention, as those of skill in the art will recognize.

Example 1

A 1 L, 3-neck round bottom flask equipped with a thermometer, reflux condenser, and mechanical stirrer was charged with 400 mL deionized water, 7.95 g (0.075 mol) of $Na_2CO_3$, and 18.0 g (0.45 mol) of NaOH pellets. A second solution containing 43.62 g (0.15 mol) of $Ni(NO_3)_2.6H_2O$, and 28.13 g (0.075 mol) of $Al(NO_3)_3.9H_2O$, and 375 mL of water was prepared and added dropwise to the first solution while stirring for a period of about 1 hour. After addition was complete, the gelatinous mixture (pH=8.2) was heat treated for about 15 hours at temperatures in the range of from 80° C. to 85° C. The resulting material was cooled, washed repeatedly with water, filtered, and dried overnight under vacuum at 70° C. The XRD of the material showed a typical hydrotalcite-like structure with d(003) value of 7.6 A. This material corresponds to the formulation $Ni_4Al_2(OH)_{12}]CO_3.4H_2O$.

Example 2

A catalyst mixture was formed by heat treating the nickel containing hydrotalcite described in Example 1. The material was heated 20° C./min. to temperatures in the range of about 450° C. to about 500° C., and kept at such temperatures for about 15 hours. After cooling the material was then sieved to different mesh sizes. The material was shown by its XRD pattern to be amorphous with only weak peaks which likely indicated a small amount of NiO. The sized materials were further calcined at 850° C.

Example 3

This example demonstrates an initial catalytic treatment of feedstock using nickel-containing catalytic materials according to the invention to provide a methane-containing gaseous mixture substantially free of compounds having 2 or more carbon atoms. The feedstock included a desulfurized natural gas composition.

Conversion of the higher hydrocarbon compounds to compounds having one carbon atoms ($C_1$) using nickel-containing catalytic materials was performed in a fixed-bed, single-pass quartz tubular flow reactor. The reactor unit consisted of a quartz reactor (9 mm×11 mm×30") with dimples located at 4" from the bottom, a stainless reactor jacket outside the quartz tube, a quartz deadman (3.6 mm×8 mm×5 inch), and a thermowell jacket (2 mm×3 mm×27 inch). It was operated in a downflow mode.

A three-zone furnace (top to bottom are 3 inch, 6 inch, and 3 inch, respectively.) was used to maintain an isothermal conditions along the reaction zone. Pressure was controlled by a back pressure regulator on the exit stream. A post reactor dropout trap was installed to condense the steam and hydrocarbon condensates. Downstream dry product flow rates were measured by a wet test meter.

Analyses of product slate were performed using an on-line HP-5880A gas chromatograph (GC) with helium and argon carrier gases through TCD and FID detectors. A 16 ft column consisting of ⅛ inch OD stainless steel tubing packed with 80/100 mesh Porapak Q(ro QS)was used to quantify the fixed gases, $C_1$ and $C_2$ hydrocarbons. Cryogenic operation (−50° C.) was required to effectively separate $H_2$, $N_2$, $O_2$, and CO. The $C_{3+}$ hydrocarbons were quantified using a 50 m capillary column (PLOT fused silica type with $Al_2O_3/KCl$ liquid phase).

Material of Example 2 (calcined at 850° C.) with particle size 40/60 mesh was charged to the quartz reactor. The catalyst bed containing 0.43 g (0.5 cc) of catalyst was pretreated in situ for 18 hours at 850° C. and 100 psig with a feed containing steam and dihydrogen at a 10/1 ratio of $H_2O/H_2$, and at a total $H_2O/H_2/N_2$ flow rate of 28,800 v/v/hr (STP). The catalyst was then evaluated at 400° C. and 100 psig with a flow rate of 14,400 v/v/hr (STP). The feedstream was derived from desulfurized natural gas which contained 96.6% $CH_4$, 2.4% $C_2H_6$, 0.7% $C_3H_8$ and 0.3% $C_4$'s. In the feedstream the ratio $H_2O/C_1$ was 0.25, and ratio $H_2O/C_{2+}$ was 3.2. The composition of the feedstream is shown in Table 1. At temperature of about 400° C. and reactor pressure of about 100 psig, composition of the effluent on a dry basis was as shown in Table 2. Mainly, the effluent contained $CH_4$, $CO_2$, and $H_2$ in equilibrium. No detectable coke or olefins were observed.

TABLE 1

| Composition | Vol., % | Dry Vol. |
|---|---|---|
| $CH_4$ | 76.6 | 96.6% |
| $C_2H_6$ | 1.9 | 24,000 ppm |
| $C_3H_8$ | 0.56 | 7,000 ppm |
| $C_4$'s | 0.24 | 3,000 ppm |
| $H_2O$ | 20.7 | — |

TABLE 2

| Composition | TCD Vol % | FID wt % |
|---|---|---|
| $CH_4$ | 90.0 | 99.85 wt % |
| $C_2H_6$ | 520 ppm | 1100 ppm |
| $C_3H_8$ | 80 ppm | 260 ppm |
| $C_4$'s | — | 110 ppm |
| CO | 0.07 | |
| $H_2$ | 6.97 | |
| $CO_2$ | 2.88 | |

These data demonstrated $Ni_4Al_2O_7$ clay-derived catalyst material has high activity at temperatures of 350° to 450° C. for converting the higher hydrocarbon compounds to form a methane-containing gaseous mixture substantially free of compounds having 2 or more carbon atoms.

Example 4

A run similar to Example 3 was conducted with a feedstream of $CO_2$/natural gas/steam. In the feedstream the ratio $CO_2/C_1$ was 1.1, the ratio $H_2O/C_1$ was 0.5, and the ratio $H_2O/C_{2+}$ was 6.5. The composition of the feedstream is shown in Table 3. At temperature of about 400° C. and reactor pressure of about 100 psig, composition of the effluent on a dry basis was as shown in Table 4. During testing period of 4 days the catalyst maintained high activity, and no coke was observed.

TABLE 3

| Composition | Vol % | dry Vol % | HCs dry Vol % |
|---|---|---|---|
| $CO_2$ | 42.7 | 53.17 | — |
| $CH_4$ | 36.34 | 45.25 | 96.6 |
| $C_2H_6$ | 0.903 | 1.11 | 24,000 ppm |
| $C_3H_8$ | 0.263 | 0.32 | 7,000 ppm |
| $C_4$'s | 0.113 | 0.14 | 3,000 ppm |
| $H_2O$ | 19.7 | — | — |

TABLE 4

| Composition | TCD Vol % | FID wt % |
|---|---|---|
| $CH_4$ | 45.067 | 99.962 |
| $C_2H_6$ | 90 ppm | 360 ppm |
| $C_3H_8$ | — | 20 ppm |
| $C_4$'s | — | — |
| CO | 0.59 | |
| $H_2$ | 3.325 | |
| $CO_2$ | 50.995 | |

Example 5

This example demonstrates a process according to the invention for preparation of synthesis gas by an initial catalytic treatment of feedstock to provide a methane-containing gaseous mixture substantially free of compounds having 2 or more carbon atoms, and reforming the gaseous mixture at elevated temperatures. The feedstock included a desulfurized natural gas composition.

Temperatures in the top portion of the reactor were controlled to a range of temperature from about 425° C. to about 450° C., and the subsequent portion of the reactor maintained at elevated temperatures in a range of about 840° C. to about 870° C.

Calcined $Ni_4Al_2O_7$ catalyst-containing material of Example 2 with particle size 40/60 mesh was charged to the quartz reactor. The top portion and subsequent portion each contained 0.43 g of catalyst with a 5.25 inch deadman between the top and bottom of the catalyst beds. The catalyst had the same pretreatment as in Example 3.

The process was carried out at the above defined temperature profile and 100 psig with a flow rate of 14,400 v/v/hr (STP). The feedstream was derived from desulfurized natural gas which contained 96.6% $CH_4$, 2.4% $C_2H_6$, 0.7% $C_3H_8$, and 0.3% $C_4$'s. In the feedstream the ratio $CO_2/C_1$ was 1, the ratio $H_2O/C_1$ was 1, and ratio $H_2O/C_{2+}$ was 12.9. The composition of the feedstream is shown in Table 5. Effluent on a dry basis was as shown in Table 6. Mainly, the effluent contained $CH_4$, $CO_2$, and $H_2$ in equilibrium. No detectable coke or olefins were observed.

TABLE 5

| Composition | Vol % | dry Vol % | HC's dry Vol % |
|---|---|---|---|
| CO | 34.31 | 51.7 | |
| $CH_4$ | 31.0 | 46.7 | 96.6 |
| $C_2H_6$ | 0.77 | 1.13 | 24,000 ppm |
| $C_3H_8$ | 0.225 | 0.33 | 7,000 ppm |
| C4's | 0.096 | 0.14 | 3,000 ppm |
| $H_2O$ | 33.60 | — | — |

TABLE 6

| Composition | TCD Vol % | FID wt % | Conversion % |
|---|---|---|---|
| $CH_4$ | 1.07 | 100 | 95.6 |
| $C_2H_6$ | — | — | |
| $C_3H_8$ | — | — | |
| C4's | — | — | — |
| CO | 38.14 | | |
| $H_2$ | 49.75 | | |
| $CO_2$ | 10.97 | | 57.7 |
| $H_2$/CO | 1.3 | | |

Example 6

A 1 L, 3-neck, round bottom flask equipped with a thermometer, reflux condenser, and mechanical stirrer was charged with 400 mL deionized water, 10.6 g (0.1 mol) of $Na_2CO_3$, and 24.0 g (0.6 mol) of NaOH pellets. A second solution containing 29.08 g (0.1 mol) of $Ni(NO_3)_2.6H_2O$, 25.64 g (0.1 mol) of $Mg(NO_3)_2.6H_2O$ and 37.51 g (0.1 mol) of $Al(NO_3)_3.9H_2O$, and 375 mL of water was prepared and added dropwise to the first solution while being stirred for a period of about 1 hour. After addition was complete, the gelatinous mixture (pH=8.5) was heated for about 15 hours at 80° to 85° C. The cooled mixture was then filtered, washed repeatedly with water, and dried overnight under vacuum at 70° C. The XRD of the material shows typical hydrotalcite-type structure with d(003) value of 7.6 A. This material corresponds to the formulation $[Ni_2Mg_2Al_2(OH)_{12}]CO_3.yH_2O$, wherein y is as previously described.

Example 7

The material described in Example 6 was calcined by placing a weighed amount of the material in a calciner and raising the temperature at 20° C./min. until temperature of 450° to 500° C. was reached. The material was kept at such temperatures for about 15 hours, cooled, and was then sieved to 12–20 mesh for use. This material was further calcined at 850° C. The XRD pattern of this catalyst shows that the bulk of the material is amorphous, and only weak peaks due to NiO.

Example 8

A 1 L, 3-neck, round bottom flask equipped with a thermometer, reflux condenser, and mechanical stirrer was charged with 400 mL deionized water, 7.95 g (0.075 mol) of $Na_2CO_3$, and 24.0 g (0.6 mol) of NaOH pellets. A second solution containing 10.91 g (0.0375 mol) of $Ni(NO_3)_2.6H_2O$, 48.08 g (0.1875 mol) of $Mg(NO_3)_2.6H_2O$ and 28.14 g (0.075 mol) of $Al(NO_3)_3.9H_2O$, and 375 mL of water was prepared and added dropwise to the first solution while being stirred for a period of about 1 hour. After addition was complete, the gelatinous mixture (pH −8.9) was heated for about 15 hours at 80° to 85° C. The cooled mixture was then filtered, washed repeatedly with water, and dried overnight under vacuum at 70° C. The XRD of the material shows typical hydrotalcite-type structure with d(003) value of 7.7 A. The material corresponds to the formulation $NiMg_5Al_2(OH)_{16}CO_3.4H_2O$.

Example 9

The material described in Example 8 was calcined by placing a weighed amount of the material in a calciner and raising the temperature at 20° C./min. until a temperature of 450° to 500° C. was reached. The material was kept at such temperatures for about 15 hours, cooled, and was then sieved to different mesh sizes. These sized materials were further calcined at 850° C.

Example 10

A 1 L, 3-neck, round bottom flask equipped with a thermometer, reflux condenser, and mechanical stirrer was charged with 400 mL deionized water, 7.95 g (0.075 mol) of $Na_2CO_3$, and 18. Og (0.45 mol) of NaOH pellets. A second solution containing 10.91 g (0.0375 mol) of $Ni(NO_3)_2.6H_2O$, 28.85 g (0.1125 mol) of $Mg(NO_3)_2.6H_2O$ and 28.14 g (0.075 mol) of $Al(NO_3)_3.9H_2O$, and 375 mL of water was prepared and added dropwise to the first solution while being stirred for a period of about 1 h. The rest of the preparation was similar to Example 1. The material corresponds to the formulation $NiMg_3Al_2(OH)_{12}CO_3.4H_2O$.

Example 11

The material described in Example 10 was calcined by placing a weighed amount of the material in a calciner and raising the temperature at 20° C./min. until a temperature of 450° to 500° C. was reached. The material was kept at that temperature for about 15 hours and was then sieved to different mesh sizes. These sized materials were further calcined at 850° C.

Example 12

A 1 L, 3-neck, round bottom flask equipped with a thermometer, reflux condenser, and mechanical stirrer was charged with 400 mL deionized water and 22.4 g (0.56 mol) of NaOH pellets. A second solution containing 20.37 g (0.07 mol) of $Ni(NO_3)_2 \cdot 6H_2O$, and 52.53 g (0.14 mol) of $Al(NO_3)_3 \cdot 9H_2O$, and 340 mL of water was prepared and added dropwise to the first solution while being stirred for a period of about 1 h. At this point the pH of the mixture was 10.3. A few drops of $HNO_3$ were added to reduce the pH to 9.5. After addition was complete, the gelatinous mixture was heated for about 15 h at 80–85° C. The cooled mixture was filtered, washed repeatedly with water, and dried overnight under vacuum at 70° C. The XRD of the material did not show typical hydrotalcite-like structure. This product was calcined at 800° C. to yield the spinel, $NiAl_2O_4$.

Procedure for Examples 13 to 19

Catalysts of this invention, other nickel-containing catalysts, and a molybdenum-based catalyst were evaluated for the conversion of methane to synthesis gas using carbon dioxide as the source of oxygen atoms. These evaluations were conducted using a fixed-bed, single-pass reactor consisting of a 9 mm×11 mm×30 inch quartz tube with indentations located 4 inches from the bottom of the tube. The reactor was operated in a downflow mode and a three-zone furnace was used to maintain isothermal conditions. Steam and condensible hydrocarbon products were collected in a cold trap. Exit gas flow rates were measured by a wet test meter. Hydrogen sulfide, if present, was removed from the product stream using a wet scrubber. Analysis was performed by gas chromatography.

For the following evaluations using carbon dioxide, unless otherwise noted, the reaction temperature was 816° C., the volumetric space velocity was 7200 $hr^{-1}$ at STP, pressure was 300 psig, the ratio of carbon dioxide to methane in the feed gas was 1.25, and the ratio of water to methane was 1.0. If used, hydrogen sulfide was at 27 ppm (by volume) in the feed gas. Using these ratios of feed gas components, the feed gas for the carbon dioxide reforming reactions was as follows:

|       | Vol. % |
|-------|--------|
| $CO_2$ | 38.4 |
| $CH_4$ | 30.8 |
| $H_2O$ | 30.8 |
| $H_2S$ | 27 ppm |

Example 13

The hydrotalcite-derived catalyst prepared according to Example 8, sieved to 80–100 mesh, was evaluated for the carbon dioxide reforming of methane. A low concentration of hydrogen sulfide ($H_2S$) was in the feed. The results are reported in Table 7, and these data show that this catalyst is an effective catalyst for reforming using carbon dioxide. The methane and carbon dioxide conversions were 76% and 41%, respectively. Selectivity of the carbon to carbon monoxide was 99.5%.

Example 14

Table 7 shows the results for the reforming of methane using carbon dioxide in the presence of commercial nickel-containing reforming catalyst. The results are similar to that of Example 13, however, the conversion of carbon dioxide was lower.

Example 15

Table 7 shows the results for the reforming of methane using carbon dioxide in the presence of a molybdenum sulfide catalyst using the same conditions and feed materials used for Examples 13 and 14. Conversions of methane and carbon dioxide were significantly lower compared to Examples 13 and 14.

Example 16

Nickel catalyst of this invention, prepared from Example 8, was tested under the same conditions used in Examples 13 to 15, however, the hydrogen sulfide was not included in the feed gases. The data from this run is also shown in Table 7. Conversions of methane and carbon dioxide were high at 77% and 40%, respectively. Carbon selectivity to carbon monoxide was 99.5%.

The water to methane ratio was decreased to 0.5 to evaluate the effect of reduced water concentration in feed gas. The temperature of the reaction was then increased to 867° C. The data from these runs are shown in Table 8.

The reduced water resulted in an increase in carbon dioxide conversion from 40% to 52%, and a decrease in the ratio of hydrogen to carbon monoxide in the syngas product. The higher reaction temperature increased the methane and carbon dioxide conversion to 82% and 60%, respectively. Therefore, low water to methane ratios and higher reaction temperature maximize carbon dioxide conversion.

Example 17

The commercial nickel containing catalyst was also evaluated using lower ratios of water to methane and higher reaction temperatures. These data are also in Table 8.

Example 18

The reforming of methane using carbon dioxide was evaluated using a physical mixture of nickel oxide on alpha alumina. The catalyst composition contained 75 weight percent NiO. The same reaction conditions were used as in Examples 13 to 15 except no hydrogen sulfide was added to the feed gas mixture. The data, which are presented in Table 7, show that the conversion of methane and carbon dioxide were only 30% and 11%, respectively.

Example 19

The nickel spinel, prepared according to the method of Example 12, was evaluated as a reforming catalyst for the formation of synthesis gas by the reaction of carbon monoxide with methane. The reaction conditions used were the same as those used in Examples 13 to 15 except there was no hydrogen sulfide in the feed gas. The data in Table 7 shows that the spinel, after 100 hours of operation, is an effective catalyst for reforming methane using carbon dioxide. The methane and carbon dioxide conversions were 86% and 47%, respectively. Selectivity of the carbon to carbon monoxide was 99.5%.

TABLE 7

| Ex. # | Hours | $H_2S^a$ | ANALYSIS, VOL. % | | | | | CONV., % | | SEL. |
|---|---|---|---|---|---|---|---|---|---|---|
| | | | $H_2$ | CO | $CH_4$ | $CO_2$ | $H_2/CO$ | $CH_4$ | $CO_2$ | co |
| 13 | 170 | Y | 43.1 | 31.8 | 6.4 | 18.5 | 1.36 | 76 | 41 | 99.5 |
| 14 | 120 | Y | 41.2 | 31.4 | 6.5 | 20.8 | 1.31 | 76 | 38 | 99.5 |
| 15 | 120 | Y | 30.1 | 22.8 | 18.4 | 28.4 | 1.32 | 47 | 26 | 99.0 |
| 16 | 150 | N | 42.4 | 32.0 | 6.2 | 19.2 | 1.30 | 77 | 40 | 99.5 |
| 17 | 150 | N | 42.6 | 32.9 | 6.0 | 18.4 | 1.30 | 77 | 42 | 99.5 |
| 18 | 4 | N | 24.8 | 13.6 | 24.2 | 37.1 | 1.80 | 30 | 11 | 99.0 |
| 19 | 100 | N | 44.4 | 35.2 | 3.6 | 15.9 | 1.30 | 86 | 47 | 99.5 |

$^a$Y = $H_2S$ was present; N = $H_2S$ not present.

TABLE 8

| Catalyst | Feed Gas Ratios$^a$ | | Conversion, % | | |
|---|---|---|---|---|---|
| | Temp. ° C. | $H_2O/CH_4$ | $CH_4$ | $CO_2$ | $H_2/CO$ |
| Example 16 | 815 | 1.0 | 77 | 40 | 1.3 |
| | 815 | 0.5 | 70 | 52 | 1.0 |
| | 867 | 0.5 | 82 | 60 | 1.0 |
| Commercial Ni Cat. | 815 | 1.0 | 77 | 42 | 1.3 |
| | 815 | 0.5 | 71 | 53 | 1.0 |
| | 860 | 0.5 | 83 | 61 | 1.0 |
| | 860 | 0.25 | 79 | 68 | 0.8 |

$^a$Pressure was 300 psig, no hydrogen sulfide in feeds. Ratio of carbon dioxide to methane was 1.25.

Example 20

The catalyst of this invention prepared from the nickel-containing hydrotalcite-like composition $[Ni_4Al_2(OH)_{12}]CO_3.4H_2O$ was compared to a commercial nickel-containing reforming catalyst for the reaction of methane with carbon dioxide. In this comparison, the gas hourly volumetric space velocity (GHSV) of the feed gas was varied and, as shown in Table 9, the catalyst of this invention was substantially more active in that conversions of methane at the high gas flow rates were considerably greater for the catalyst derived from the hydrotalcite-like catalyst precursor than for the commercial catalyst.

In this evaluation, the catalyst (0.02 cc) was diluted with 50 parts by weight of alpha alumina per part of catalyst. Additionally, the catalyst bed was preceded by a 1 inch bed of alumina and followed by a 0.25 inch bed of alumina. The ratio of carbon dioxide to methane in the feed was 1.2, the ratio of water to methane was 1.0, and the feed gas was 50% diluted with nitrogen. The reaction pressure was 100 psig, and the reaction temperature was as shown in Table 9.

TABLE 9

| | Conversion of Methane (%) | | | | | |
|---|---|---|---|---|---|---|
| | Catalyst from $[Ni_4Al_2(OH)_{12}].4H_2O$ | | | Commercial Catalyst | | |
| GHSV | 800° C. | 750° C. | 700° C. | 800° C. | 750° C. | 700° C. |
| $1.8 \times 10^5$ | | 80.1 | 65.0 | 90.2 | 79.7 | 61.1 |
| $3.6 \times 10^5$ | 91.0 | 80.1 | 63.8 | 86.8 | 77.1 | 48.5 |
| $5.4 \times 10^5$ | | 79.3 | | 81.7 | 70.1 | 31.3 |
| $7.2 \times 10^5$ | 89.7 | 78.9 | 59.0 | 76.1 | 63.4 | |
| $9.0 \times 10^5$ | | 77.9 | | 71.8 | 55.6 | |
| $10.8 \times 10^5$ | 86.8 | 76.0 | 56.4 | 65.7 | 49.9 | |
| $12.6 \times 10^5$ | | 73.4 | | | | |

Example 21

Methane was steam-reformed to synthesis gas using the catalyst prepared according to Example 8. The same reactor was used, as described hereinabove, for Examples 13–20. The reactor was loaded with 0.33 grams of the catalyst (40–60 mesh size) and the catalyst bed was pretreated for 18 hours at 850° C. with a feed of water, hydrogen and nitrogen at a flow-rate of 28,800 (volume gas/volume catalyst/hour at STP). The volumetric ratio of water, hydrogen gas and nitrogen gas was 109.1:10.9:120, respectively. After this pretreatment, the feed gas was changed to a 50/50 mole ratio of methane and water at a total gas flow rate of 120 sccm. After operating at these conditions, the composition of the gas exiting the reactor on a dry basis was as follows:

| Component | Mole % |
|---|---|
| Methane | 6.6 |
| Carbon monoxide | 22.2 |
| Hydrogen gas | 69.1 |
| Carbon dioxide | 2.1 |
| Ratio $H_2/CO$ | 3.1 |

This example demonstrates that the catalyst of this invention is effective for the steam reforming of methane using low ratios of water (steam) to methane. Using this low ratio, a low molar ratio (i.e., 3:1) of hydrogen-to-carbon monoxide in the synthesis gas product was formed. During this evaluation, there was no evidence of coke formation.

For the purposes of the present invention, "predominantly" is defined as more than about fifty per cent. "Substantially" is defined as occurring with sufficient frequency or being present in such proportions as to measurably affect macroscopic properties of an associated compound or system. Where the frequency or proportion for such impact is not clear, substantially is to be regarded as about twenty per cent or more. The term "essentially" is defined as absolutely except that small variations which have no more than a negligible effect on macroscopic qualities and final outcome are permitted, typically up to about one percent.

Examples have herein been presented and hypotheses advanced in order to better communicate certain facets of the invention. The scope of the invention is determined solely by the scope of the appended claims.

Certain embodiments of the present invention have been set forth in the preceding description of the invention. However, alternate embodiments and various modifications will be apparent to those skilled in the art. These alternatives and modifications are considered to be equivalent and within the spirit and scope of the present invention.

What is claimed is:

1. A process for preparation of synthesis gas comprising dihydrogen and oxides of carbon from feedstocks comprising methane and/or hydrocarbons having up to about 12 carbon atoms which comprises the steps of
(A) feeding a stream comprising one or more hydrocarbon compounds having up to about 12 carbon atoms, and steam and/or carbon dioxide into an initial conversion zone containing a catalyst for initial conversions,
(B) controlling temperatures within the initial conversion zone to temperatures in a range of temperature downward from 500° C. to 300° C.,
(C) converting the hydrocarbon compounds having up to about 12 carbon atoms in the presence of the initial conversion zone catalyst to form a methane-containing gaseous mixture substantially free of compounds having 2 or more carbon atoms, and
(D) reforming the methane-containing gaseous mixture with steam and/or carbon dioxide in a subsequent zone containing reforming catalyst at temperatures in a range of temperature upward from about 600° C. to 1100° C. whereby a synthesis gas comprising dihydrogen and oxides of carbon is formed,
wherein the catalyst for initial conversions used in step (C) and the reforming catalyst used in step (D) comprise mixtures formed by heat treating the same or a different nickel-containing hydrotalcite precursor compound to temperatures in a temperature range upward from 700° C. to 1050° C. thereby forming catalytic materials resistant to coking and/or deactivation in the presence of sulfur-containing compounds.

2. A process for preparation of synthesis gas comprising dihydrogen and oxides of carbon from feedstocks comprising methane and/or hydrocarbon compounds having up to about 12 carbon atoms which comprises the steps of
(A) feeding a stream comprising one or more hydrocarbon compounds having up to about 12 carbon atoms and including a source of sulfur, and steam and/or carbon dioxide into an initial conversion zone containing catalyst for initial conversions,
(B) controlling temperatures within the initial conversion zone to temperatures in a range of temperature downward from 500° C. to 300° C.,
(C) converting the hydrocarbon compounds having up to about 12 carbon atoms in the presence of the initial conversion zone catalyst and the source of sulfur to form a methane-containing gaseous mixture substantially free of compounds having 2 or more carbon atoms, and
(D) reforming the methane-containing gaseous mixture comprising the source of sulfur with steam and/or carbon dioxide in a subsequent zone containing reforming catalyst at temperatures in a range of temperature upward from 600° C. to 1100° C. whereby a synthesis gas comprising dihydrogen and oxides of carbon is formed, and
wherein the catalyst for initial conversions used in step (C) and the reforming catalyst used in step (D) comprises mixtures formed by heat treating the same or a different nickel containing hydrotalcite precursor compound to temperatures in a temperature range upward from 700° C. to 1050° C. thereby forming catalytic materials resistant to coking and/or deactivation in the presence of sulfur-containing compounds, and wherein the catalytic materials comprise (a) $M^{2+}O$, (b) $M^{2+}Al_2O_4$ spinet and (c) a hybrid phase comprising (i) a $M^{2+}O$ component and (ii) a $M^{2+}Al_2O_4$ spinet component in the same catalyst crystallite and joined through an epitaxial interface, said epitaxial interface being an area in the crystallite where crystalline species of both components (i) and (ii) coexist and form a well defined interface, and wherein $M^{2+}$ is $Ni^{2+}$ or a mixture of $Ni^{2+}$ plus another metal ion or plus other metal ions.

3. The process according to claim 2 wherein the crystallites comprising the hybrid phase are 5 to 400 nanometers in size.

4. The process according to claim 2 wherein the stream feeding into the initial conversion zone comprises a natural gas composition and steam in amount sufficient to provide a ratio of steam to carbon in a range from 0.2 to 2.0.

5. The process according to claim 2 wherein the stream feeding into the initial conversion zone comprises naphthas with a final boiling point up to 200° C. and steam in amount sufficient to provide a ratio of steam to carbon in a range from 1.5 to 10.

6. The process according to claim 2 wherein at least one of the nickel-containing hydrotalcite precursor compounds is represented by

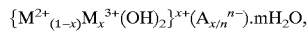

where $M^{2+}$ is $Ni^{2+}$ ion or a mixture of $Ni^{2+}$ ion and another metal ion having a valence of 2+; $M^{3+}$ is a metal ion having a valence of 3+: x is a number from 0.25 to 0.50; $A^{n-}$ is an anion having a negative charge of n; and m is 0 or a positive number.

7. The process according to claim 6 wherein $M^{2+}$ is a mixture of $Ni^{2+}$ and $Mg^{2+}$; $M^{3+}$ is $Al^{3+}$; and A is carbonate.

8. The process according to claim 2 wherein the catalyst for initial conversions used in step (C) and the reforming catalyst used in step (D) comprise mixtures formed by heat treating the same nickel-containing hydrotalcite precursor compound and each catalyst comprises nickel in an amount of from 5 to 75 percent based upon the weight of the catalyst.

9. The process according to claim 2 wherein at least one of the nickel-containing hydrotalcite precursor compounds is represented by $\{Ni_2Al_2(OH)_{12})\}CO_3.4H_2O$.

10. The process according to claim 2 wherein at least one of the nickel-containing hydrotalcite precursor compounds is represented by $\{Ni_2Mg_2Al_2(OH)_{12}\}CO_3.4H_2O$.

11. The process according to claim 2 wherein at least one of the nickel-containing hydrotalcite precursor compounds is represented by $\{NiMg_5Al_2(OH)_{15}\}CO_3.4H_2O$.

12. The process according to claim 2 wherein at least one of the nickel-containing hydrotalcite precursor compounds is represented by $\{NiMg_3Al_2(OH)_{12}\}CO_3.4H_2O$.

13. A process for preparation of synthesis gas comprising dihydrogen and oxides of carbon from feedstocks comprising methane and/or hydrocarbon compounds having up to about 12 carbon atoms which comprises the steps of
(A) feeding a stream comprising one or more hydrocarbon compounds having up to about 12 carbon atoms and including a source of sulfur, and steam and/or carbon dioxide into an initial conversion zone containing catalyst for initial conversions,
(B) controlling temperatures within the initial conversion zone to temperatures in a range of temperature downward from 500° C. to 300° C.,
(C) converting the hydrocarbon compounds having up to about 12 carbon atoms in the presence of the initial conversion zone catalyst and the source of sulfur to form a methane-containing gaseous mixture substantially free of compounds having 2 or more carbon atoms, and
(D) reforming the methane-containing gaseous mixture comprising the source of sulfur with steam and/or carbon dioxide in a subsequent zone containing reforming catalyst at temperatures in a range of temperature upward from 600° C. to 1100° C. whereby a synthesis gas comprising dihydrogen and oxides of carbon is formed, and wherein the catalyst for initial conversions used in step (C) and the reforming catalyst used in step (D) comprises mixtures formed by heat treating the same or a different nickel containing hydrotalcite precursor compound to temperatures in a temperature range upward from 700° C. to 1050° C. thereby forming catalytic materials resistant to coking and/or deactivation in the presence of sulfur-containing compounds, and wherein the catalytic materials comprise (a) $M^{2+}O$, (b) $M^{2+}Al_2O_4$ spinel and (c) a hybrid phase comprising (i) a $M^{2+}O$ component and (ii) a $M^{2+}Al_2O_4$ spinet component in the same catalyst crystallite and joined through an epitaxial interface, said epitaxial interface being an area in the crystallite where crystalline species of both components (i) and (ii) coexist and form a well defined interface, and wherein $M^{2+}$ is $Ni^{2+}$ or a mixture of $Ni^{2+}$ plus another metal ion or plus other metal ions, and comprises nickel in an amount of from 5 to 75 percent based upon the weight of the catalyst, and wherein at least one of the nickel-containing hydrotalcite precursor compounds is represented by $$\{M^{2+}_{(1-x)}M_x^{3+}(OH)_2\}^{x+}(A_{x/n}^{n-}) \cdot mH_2O,$$

where $M^{2+}$ is $Ni^{2+}$ ion or a mixture of $Ni^{2+}$ ion and another metal ion having a valence of 2+; $M^{3+}$ is a metal ion having a valence of 3+; x is a number from 0.25 to 0.50 $A^{n-}$ is an anion having a negative charge of n; and m is 0 or a positive number.

14. The process according to claim 13 wherein the crystallites comprising the hybrid phase are 5 to 400 nanometers in size.

15. The process according to claim 13 wherein the stream feeding into the initial conversion zone comprises a natural gas composition and steam in amount sufficient to provide a ratio of steam to carbon in a range from 0.2 to 2.0.

16. The process according to claim 13 wherein the stream feeding into the initial conversion zone comprises naphthas with a final boiling point up to 200° C. and steam in amount sufficient to provide a ratio of steam to carbon in a range from 1.5 to 10.

17. The process according to claim 13 wherein at least one of the nickel-containing hydrotalcite precursor compounds is represented by $$\{M^{2+}_{(1-x)}M_x^{3+}(OH)_2\}^{x+}(A_{x/n}^{n-}) \cdot mH_2O,$$

where $M^{2+}$ is $Ni^{2+}$ ion or a mixture of $Ni^{2+}$ ion and another metal ion having a valence of 2+; $M^{3+}$ is a metal ion having a valence of 3+; x is a number from 0.25 to 0.50; $A^{n-}$ is an anion having a negative charge of n; and m is 0 or a positive number.

18. The process according to claim 17 wherein $M^{2+}$ is a mixture of $Ni^{2+}$ and $Mg^{2+}$; $M^{3+}$ is $Al^{3+}$; and A is carbonate.

19. The process according to claim 13 wherein the catalyst for initial conversions used in step (C) and the reforming catalyst used in step (D) comprise mixtures formed by heat treating the same nickel-containing hydrotalcite precursor compound.

20. The process according to claim 13 wherein at least one of the nickel-containing hydrotalcite precursor compounds is represented by $\{Ni_4Al_2(OH)_{12}\}CO_3 \cdot 4H_2O$.

21. The process according to claim 13 wherein at least one of the nickel-containing hydrotalcite precursor compounds is represented by $\{Ni_2Mg_2Al_2(OH)_{12}\}CO_3 \cdot 4H_2O$.

22. The process according to claim 13 wherein at least one of the nickel-containing hydrotalcite precursor compounds is represented by $\{NiMg_5Al_2(OH)_{10}\}CO_3 \cdot 4H_2O$.

23. The process according to claim 13 wherein at least one of the nickel-containing hydrotalcite precursor compounds is represented by $\{NiMg_3Al_2(OH)_{12}\}CO_3 \cdot 4H_2O$.

* * * * *